US012111191B2

(12) United States Patent  
'T Hooft et al.

(10) Patent No.: US 12,111,191 B2
(45) Date of Patent: Oct. 8, 2024

(54) OPTICAL FIBER SENSOR, OPTICAL SYSTEM AND METHOD OF OPTICALLY INTERROGATING AN OPTICAL FIBER SENSOR

(71) Applicant: KONINKLIJKE PHILIPS N.V., Eindhoven (NL)

(72) Inventors: Gert Wim 'T Hooft, Eindhoven (NL); Eibert Gerjan Van Putten, 's-Hertogenbosch (NL); Jeroen Jan Lambertus Horikx, Weert (NL); Anna Hendrika Van Dusschoten, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 18/367,497

(22) Filed: Sep. 13, 2023

(65) Prior Publication Data

US 2023/0417580 A1 Dec. 28, 2023

Related U.S. Application Data

(63) Continuation of application No. 17/289,281, filed as application No. PCT/EP2019/079660 on Oct. 30, 2019, now Pat. No. 11,788,868.

(30) Foreign Application Priority Data

Nov. 8, 2018 (EP) .................... 18205171

(51) Int. Cl.
  *G01D 5/353* (2006.01)
  *G01B 11/24* (2006.01)

(52) U.S. Cl.
  CPC ..... *G01D 5/35316* (2013.01); *G01B 11/2441* (2013.01); *G01D 5/35374* (2013.01)

(58) Field of Classification Search
  CPC ........... G01D 5/35316; G01D 5/35374; G01B 11/2441; G01B 11/18; G01B 9/02004;
  (Continued)

(56) References Cited

U.S. PATENT DOCUMENTS

| 5,426,297 A | 6/1995 | Dunphy |
| 6,337,737 B1 * | 1/2002 | Chang ................ G01D 5/35316 385/12 |

(Continued)

FOREIGN PATENT DOCUMENTS

| CN | 106706030 | 5/2017 |
| JP | 2011247595 | 12/2011 |

(Continued)

OTHER PUBLICATIONS

International Search Report and Written Opinion Dated Dec. 3, 2019 For International Application No. PCT/EP2019/079660 Filed Oct. 30, 2019.

(Continued)

*Primary Examiner* — Tony Ko

(57) ABSTRACT

The present invention relates to an optical fiber sensor, comprising an optical fiber having embedded therein at least one fiber core (14, 16, 18, 20) extending along a length of the optical fiber, the at least one fiber core having a plurality of single fiber Bragg gratings (40, 42, 44) arranged in series along the at least one fiber core (14, 16, 18, 20), wherein each fiber Bragg grating (40, 42, 44) has a single reflection spectrum around a single reflection peak wavelength when interrogated with light in an unstrained state of the at least one fiber core (14, 16, 18, 20), wherein the reflection peak wavelengths of the single reflection spectra are different from fiber Bragg grating (40, 42, 44) to fiber Bragg grating (Continued)

(40, 42, 44) along the at least one fiber core. Also described is an optical system and a method of interrogating an optical fiber sensor.

14 Claims, 5 Drawing Sheets

(58) Field of Classification Search
CPC . G01B 11/24; G02B 6/02085; G02B 6/29319
See application file for complete search history.

(56) References Cited

U.S. PATENT DOCUMENTS

| | | | |
|---|---|---|---|
| 8,773,650 B2 | 7/2014 | Froggatt | |
| 9,417,057 B2 | 8/2016 | 'T Hooft | |
| 10,586,081 B2 * | 3/2020 | Austerlitz | G01D 5/35316 |
| 2013/0308138 A1 | 11/2013 | 'T Hooft | |
| 2014/0200986 A1 | 7/2014 | Farrell | |
| 2015/0029511 A1 | 1/2015 | 'T Hooft | |
| 2017/0153387 A1 | 6/2017 | Wei | |
| 2018/0266813 A1 | 9/2018 | Sasaki | |

FOREIGN PATENT DOCUMENTS

| | | |
|---|---|---|
| JP | 2013146245 | 12/2011 |
| WO | 2007004339 | 1/2009 |
| WO | 2013/136247 | 9/2013 |
| WO | 2013146245 | 10/2013 |
| WO | 2014/200986 | 12/2014 |

OTHER PUBLICATIONS

Breglio, et al: "Chirped-pulsed frequency modulation (C-PFM) for fiber Bragg grating sensors multiplexing", Optical Fiber Technology, Elsevier, vol. 12, No. 1, Jan. 1, 2006.

Chen, et al: "Multi-resonance peaks fiber Bragg gratings based on largely-chirped structure", Optics Communications 412 (2018) 150-154.

Feng, et al: "Compact Optical Fiber 3D Shape Sensor Based on a Pair of Orthogonal Tilted Fiber Bragg Gratings", Scientific Reports, 2015.

Kersey, et al: "Fiber Grating Sensors", Journal of Lightwave Technology, vol. 15, No. 8, Aug. 1997.

Lee, et al: "Temperature-compensated fiber-optic 3D shape sensor based on femtosecond laser direct-written Bragg grating waveguides", Optics Express, vol. 21, No. 20, Oct. 7, 2013.

* cited by examiner

OPTICAL FIBER SENSOR, OPTICAL SYSTEM AND METHOD OF OPTICALLY INTERROGATING AN OPTICAL FIBER SENSOR

CROSS REFERENCE TO RELATED APPLICATIONS

This application is a Continuation Application of U.S. patent application Ser. No. 17/289,281 filed Apr. 28, 2021, which is the U.S. National Phase application under 35 U.S.C. § 371 of International Application No. PCT/EP2019/079660 filed Oct. 30, 2019, which claims the benefit of European Patent Application Number 18205171.4 filed Nov. 8, 2018. These applications are hereby incorporated by reference herein.

FIELD OF THE INVENTION

The present invention generally relates to the field of optical fiber sensors. In particular, the present invention relates to an optical fiber sensor suitable for use in optical shape sensing. The invention also relates to an optical system comprising an optical fiber sensor and a method of optically interrogating an optical fiber sensor.

BACKGROUND OF THE INVENTION

An optical fiber sensor may be used in optical shape sensing (OSS) which is a technology with which the three-dimensional shape of a special optical fiber can be reconstructed using back-reflectometry based on reflections of light within the fiber. Optical shape sensing is about to find the shape of an elongated medical device such as a guide wire or catheter by optical means without using harmful radiation. To this end, an optical fiber is incorporated in the medical device. Light is sent into the fiber sensor and the back-reflected light is monitored with interferometers. In this way the reflected spectrum is recorded at every position along the fiber sensor. Spectral shifts in the reflected spectrum may occur due to various stimuli, which may be a change in curvature, twist, temperature and/or axial strain which may be applied to the optical fiber sensor when the medical device is used in a surgical intervention. These stimuli may be disentangled by having a special fiber sensor geometry. Usually, a fiber sensor has a four fiber core design in which a fiber core in the center of the cross section of the optical fiber is only sensitive to temperature and axial strain, while three outer cores which are helically wound around the center are also sensitive to curvature in two directions and twist.

Document U.S. Pat. No. 8,773,650 B1 describes the basic principles of the shape sensing technology.

In optical shape sensing, distributed strain measurements are performed simultaneously on each of the fiber cores of a multi-core fiber sensor, from which specific deformations of the optical fiber at every position along the length of the fiber sensor are calculated. The distributed strain measurement is performed, for example, with the method of swept-source interferometry, in which the wavelength of a laser, e.g. a single-mode laser, is varied monotonically over a well-defined wavelength range. Each fiber core is in communication with its own interferometer. The light from the light source is fed into an interferometer with a reference branch and the measurement branch. The measurement branch contains the fiber sensor under test. A detector measures the combination of the light reflected from the fiber sensor under test and the light traversing through the reference branch. The detector signal is sampled in equidistant steps of optical frequency. In Fourier Domain Backscatter Reflectometry, this interferometric spectrum is Fourier transformed resulting in a signal as function of optical delay time $\tau$, i.e. position z on the device ($\tau=2nz/c$, where a factor of 2 is taken into account since the light is travelling up and down in the fiber sensor).

A medical device which is shape sensing enabled, such as a guide wire or catheter will be moved over substantial distances in a surgical intervention, i.e. many optical wavelengths. Optical back reflectometry, however, requires sub-wavelength stability. In order to reduce the vibration sensitivity, the reflection spectra are recorded in a short time, typically smaller than 2 ms. All the shorter the time all the smaller the amount of light can be captured, and hence all the smaller the signal-to-noise ratio. Since medical devices such as guide wires and catheters are disposable, they will be connected to the optical interrogator via an optical connector. Optical connectors give rise to an additional loss of light, especially in the case of multi-core fiber sensors. Taken the above into consideration, it is obvious that the small amount of reflectivity per unit length intrinsic to a single mode fiber (Rayleigh scattering) is not enough for robust and accurate shape sensing. Therefore, the reflectivity of the sensor is enhanced by incorporating fiber Bragg gratings.

Optical fiber sensors having fiber Bragg gratings are known from WO 2014/200986 A1 and U.S. Pat. No. 9,417,057 B1. According to the fiber Bragg grating designs as described in these documents, the reflection spectrum of the fiber sensors is broad. The same holds for fiber sensors which rely on Rayleigh scattering. The reflection spectrum spans at least the scan range of the interrogator and usually even beyond that range. The consequence of such broad spectra is twofold. Firstly, the phase of the signal in the time delay domain, i.e. the position along the sensor, of adjacent sample points is widely varying. Comparing the phase of a particular measurement with the corresponding one of a reference measurement, in which the fiber sensor is in a reference shape (usually a straight shape) needs to be performed for the exact identical location with only a very small margin for positional errors. The alignment of the measurements should be well below a single sample index. This process of phase tracking is cumbersome, prone to errors and computationally intensive. Secondly, in the case of Rayleigh scattering and overlapping chirped fiber Bragg gratings as disclosed in WO 2014/200986 A1, the spectrum is broad at any position along the sensor. This means that each point is probed during the full spectral scan. During the full scan each position should stay stable with sub-wavelength accuracy, or errors will occur. In other words, sensors with broad spectra have the disadvantage to be more sensitive to vibrations than sensors with narrow spectrum. On the other hand, for fiber sensors exhibiting a narrow reflection spectrum the signal-to-noise ratio will be reduced when considering the signal data in the time delay domain.

US 2015/0029511 discloses an optical fiber sensor comprising one or more fiber cores having fiber Bragg gratings which are effectively continuous along the optical fiber. The reflection spectrum may encompass a wavelength span equaling the wavelength scan of an optical source in a reflectometer.

US 2018/0266813 A1 discloses a curvature sensor comprising a flexible light guide including cores, wherein fiber Bragg gratings (FBGs) are provided in the cores and constitute FBG sensor groups at predetermined positions along the cores. FBG sensors in a core include a first FBG sensor and a second FBG sensor next to it. The first and second FBG sensors include gratings having first and second pitches, wherein the first pitch is shorter than the second pitch and is closer to the second pitch than other pitches of gratings of all FBG sensors provided in the core and including gratings having pitches shorter than the second pitch.

US 2017/0153387 A1 discloses a fiber optic sensing device using ultra-weak, terahertz-range reflector structures. A narrow-bandwidth tunable laser interrogation system interrogates the optical fiber and measures changes in reflections and interference patterns caused by physical changes in the optical fiber.

Thus, there still is a need for an improved optical fiber sensor which is less sensitive to vibrations and nevertheless exhibits a sufficiently large signal-to-noise ratio and thus is suitable for use in optical shape sensing with improved shape sensing accuracy.

SUMMARY OF THE INVENTION

It is an object of the present invention to provide an optical fiber sensor which allows for optical shape sensing with improved accuracy.

It is a further object to provide a method of optically interrogating an optical fiber sensor.

It is a further object of the present invention to provide an optical system comprising an optical fiber sensor.

According to a first aspect of the invention, an optical fiber sensor is provided, comprising an optical fiber having embedded therein at least one fiber core extending along a length of the optical fiber, the at least one fiber core having a plurality of single fiber Bragg gratings arranged in series along the at least one fiber core, wherein each fiber Bragg grating has a single reflection spectrum around a single reflection peak wavelength when interrogated with light in an unstrained state of the at least one fiber core, wherein the reflection peak wavelengths of the single reflection spectra are different from fiber Bragg grating to fiber Bragg grating along the at least one fiber core.

The optical fiber sensor according to the invention makes use of a particular design of fiber Bragg gratings. The one or more fiber cores of the optical fiber sensor according to the invention have a plurality of single fiber Bragg gratings each having a single resonance wavelength, wherein the resonance wavelengths are different among the fiber Bragg gratings. In particular, each fiber Bragg grating may be configured such that its single reflection spectrum is narrow around a single reflection peak wavelength. In other words, each fiber Bragg grating has a single resonance wavelength which is as constant as possible along the respective fiber Bragg grating, and the resonance wavelengths of different fiber Bragg gratings are different. In other words, each fiber Bragg grating has a resonance wavelength in response to light, wherein the resonance wavelength of the fiber Bragg gratings in a same fiber core differ from each other. The single reflection spectra of the fiber Bragg gratings preferably are some magnitudes narrower than the scan wavelength range used for interrogating the fiber core. The optical fiber sensor according to the invention thus preferably has a plurality of locally narrow reflection spectra at the fiber Bragg gratings along the length of the optical fiber core. On the other hand, the total reflection spectrum spanned by the single reflection spectra is broadened substantially in comparison to the width of the single reflection spectra of the single fiber Bragg gratings. A locally narrow reflection spectrum corresponds to a smoothly, slowly varying or even constant phase as a function of optical delay. During phase tracking the requirement to align measurement and reference thus is less critical. In the limit of a constant phase for the reference measurement the tolerance is maximized. Further, when a spectrum is locally narrow the corresponding position on the sensor will be probed during a small fraction of the total wavelength scan. Effectively, the local scan time may be reduced. Thus, the demand for sub-wavelength stability only needs to be satisfied in a reduced period of time. The overall sensitivity for vibrations is diminished in the optical fiber sensor according to the invention.

On the other hand, compared with an optical fiber sensor which exhibits a narrow total reflection spectrum, for example a fiber sensor having a single resonance wavelength along its length, the optical fiber sensor according to the invention has the advantage that the signal-to-noise ratio is increased due to the broadened total reflection spectrum spanned by the single reflection spectra of all fiber Bragg gratings.

The fiber Bragg gratings may be formed by a periodically varying refractive index for the mode propagating through the fiber core. The spectral width of the single reflection spectra is mainly determined by the total number of periods of the respective fiber Bragg grating. The higher the number of periods of the fiber Bragg grating, the smaller the width of the single reflection spectrum of the fiber Bragg grating.

In the optical fiber sensor, the reflection peak wavelength of the single reflection spectra may be monotonically shifted from fiber Bragg grating to fiber Bragg grating along the at least one fiber core. The reflection peak wavelength may be monotonically shifted in an increasing or decreasing manner when seen from the proximal end of the fiber core. The amount of the shift of the reflection peak wavelength of the single reflection spectra may be small, but large enough to avoid a substantial overlap of the single reflection spectra of adjacent fiber Bragg gratings which might give rise to undesired interference effects between neighbor FBGs and undesired multiple reflections among the FBGs. The reflection peak wavelengths or resonance wavelengths of the fiber Bragg gratings may be shifted stepwise from fiber Bragg grating to fiber Bragg grating.

In particular, the difference between reflection peak wavelengths of the single reflection spectra of adjacent fiber Bragg gratings may be equal to or slightly larger than a spectral width of the single reflection spectra of the adjacent fiber Bragg gratings. In this case, the single reflection spectra are sufficiently separated from each other.

The single reflection spectra of the fiber Bragg gratings may have in each case a reflectivity amplitude of less than 3%, or less than 2%, or even as low as 1% or slightly less than 1%.

When the reflectivity (strength) of each of the individual single-frequency fiber Bragg gratings is limited in this way, effects of multiple reflections are further reduced and may be negligible small on the measured signal phase along the length of the fiber sensor. When the probability of a reflection event is large, the light might also have a finite probability of being reflected three or more times. In such a case the light is bouncing up and down the fiber sensor a few times, meaning that the exact position from where the reflection event occurred is obscured. These events add quasi random signal at odd locations along the fiber sensor and even beyond. In practice the reflectivity of the fiber sensor should not exceed a value of a few percent. The amount of reflectivity may be adjusted, for example, by the amount of modulation in refractive index along a fiber Bragg grating. Consequently, the modulation depth of the refractive index along the fiber Bragg grating should be small.

A preferential ratio of a spectral width of at least one of the single reflection spectra to a length of the respective single fiber Bragg grating may be in a range of $10^{-10}$ to $3 \times 10^{-10}$.

For example, the length of a single fiber Bragg grating may be about 100 mm, wherein in this case the spectral width of the respective single reflection spectrum may be in a range of 10 pm-30 pm. The number of single fiber Bragg gratings arranged along the respective fiber core may be chosen depending on the overall length of the fiber sensor and the individual length of the single fiber Bragg gratings.

As mentioned above, the single reflection spectra of all fiber Bragg gratings span a total reflection spectrum. The spectral range of the total reflection spectrum of the fiber sensor thus is broadened with respect to each of the single reflection spectra. However, the total spectral range should be not too large, because wavelength shifts of the resonance wavelengths of the fiber Bragg gratings due to strain, in particular bend strain should be taken into account. The smaller the bend radius of the fiber sensor, the larger are the wavelength shifts of the reflection peak wavelength of the fiber Bragg gratings. The wavelength shifts should fall into the scan wavelength range used for interrogating the fiber sensor. For example, for a resonance wavelength or reflection peak wavelength of 1545 nm, a bend radius of 6 mm results in wavelength shifts of +/−7.2 nm of the reflection peak wavelength, spanning in total a range of 14.4 nm. Temperature effects and axial strain may shift the resonances another about 1 nm to higher wavelengths respectively. For a total scan wavelength range of 16.7 nm, this leaves about 1.4 nm for spectral broadening of the total reflection spectrum of the sensor by step-like shifts of the resonance wavelengths (reflection peak wavelengths) from FBG to FBG.

Thus, in a practical case, the fiber Bragg gratings may span a total reflection spectrum with a spectral range in a range of 0.6 nm to 1.4 nm in an unstrained state of the at least one fiber core. The total spectral range may also be in a range of 0.8 nm to 1.0 nm in an unstrained state of the at least one fiber core.

Preferentially, the fiber Bragg gratings are arranged immediately adjacent to one another along the at least one fiber core. There may be no gap or a very small gap between immediately adjacent fiber Bragg gratings. In other words, the fiber Bragg gratings are preferentially concatenated to one another.

At the gaps between adjacent fiber Bragg gratings, the phase of the optical back-reflection signal may make a sudden jump. In order to reduce the effects of gaps at the concatenation points of successive gratings, near the beginning and end of a fiber Bragg grating, the grating strength (reflectivity) can be increased or decreased.

The optical fiber may have embedded therein at least four fiber cores distributed around a longitudinal axis of the optical fiber and each extending along the length of the optical fiber, the at least four fiber cores each having a plurality of single fiber Bragg gratings arranged in series along the respective fiber core, wherein each fiber Bragg grating of each of the fiber cores has a single reflection spectrum around a single reflection beam wavelength when interrogated with light in an unstrained state of the at least one fiber core, and wherein the reflection peak wavelength of the single reflection spectra are different from fiber Bragg grating to fiber Bragg grating along the respective fiber core.

Among the at least four fiber cores, the configuration of the respective fiber Bragg gratings preferably is the same from fiber core to fiber core.

An optical fiber sensor according to one or more of the afore-described embodiments is particularly suitable for shape sensing purposes because it allows for an improved accuracy in shape sensing.

According to a second aspect of the present invention, a method of optically interrogating an optical fiber sensor is provided, comprising an optical fiber sensor of the first aspect,
    irradiating light into the at least one fiber core, wherein the light has wavelengths scanned through a scan wavelength range, wherein the scan wavelength range is centered at a wavelength which substantially is a center wavelength of a total spectral range spanned by the single reflection spectra of the fiber Bragg gratings in an unstrained state of the at least one fiber core,
    receiving reflection light from the at least one fiber core, the reflection light originating from the fiber Bragg gratings of the at least one fiber core.

The scan wavelength range may be increased with at least the total spectral range spanned by the single reflection spectra of the FBGs in an unstrained state of the at least one fiber core such that the range in strain is not diminished.

For example, a scan wavelength range of about 14.4 nm may be increased to 15.4 nm, when the total spectral range spanned by the single reflection spectra of the FBGs of the at least one fiber core in an unstrained state thereof is in a range of 0.8 nm to 1.0 nm.

A ratio of the scan wavelength range to the total spectral range spanned by the single reflection spectra of the single fiber Bragg gratings in an unstrained state of the at least one fiber core may be in a range from 5 to 20, and may be about 5, about 10, about 15, or about 20.

According to a third aspect of the present invention, an optical system is provided, comprising an optical fiber sensor of the first aspect,
    an interrogation console configured to
        irradiate light into the at least one fiber core, wherein the light has wavelengths scanned through a scan wavelength range, wherein the scan wavelength range is centered at a wavelength which substantially is a center wavelength of a total spectral range spanned by the single reflection spectra of the FBGs of the at least one fiber core in an unstrained state of the at least one fiber core,
        receive reflection light from the at least one fiber core, the reflection light originating from the fiber Bragg gratings of the at least one fiber core.

It is to be understood that all embodiments of the optical fiber sensor as described above can be combined with one another in arbitrary combinations and with the method according to the second aspect and the optical system according to the third aspect.

BRIEF DESCRIPTION OF THE DRAWINGS

These and other aspects of the invention will be apparent from and elucidated with reference to the embodiments described hereinafter. In the following drawings.

DETAILED DESCRIPTION OF THE INVENTION

Figure 1:
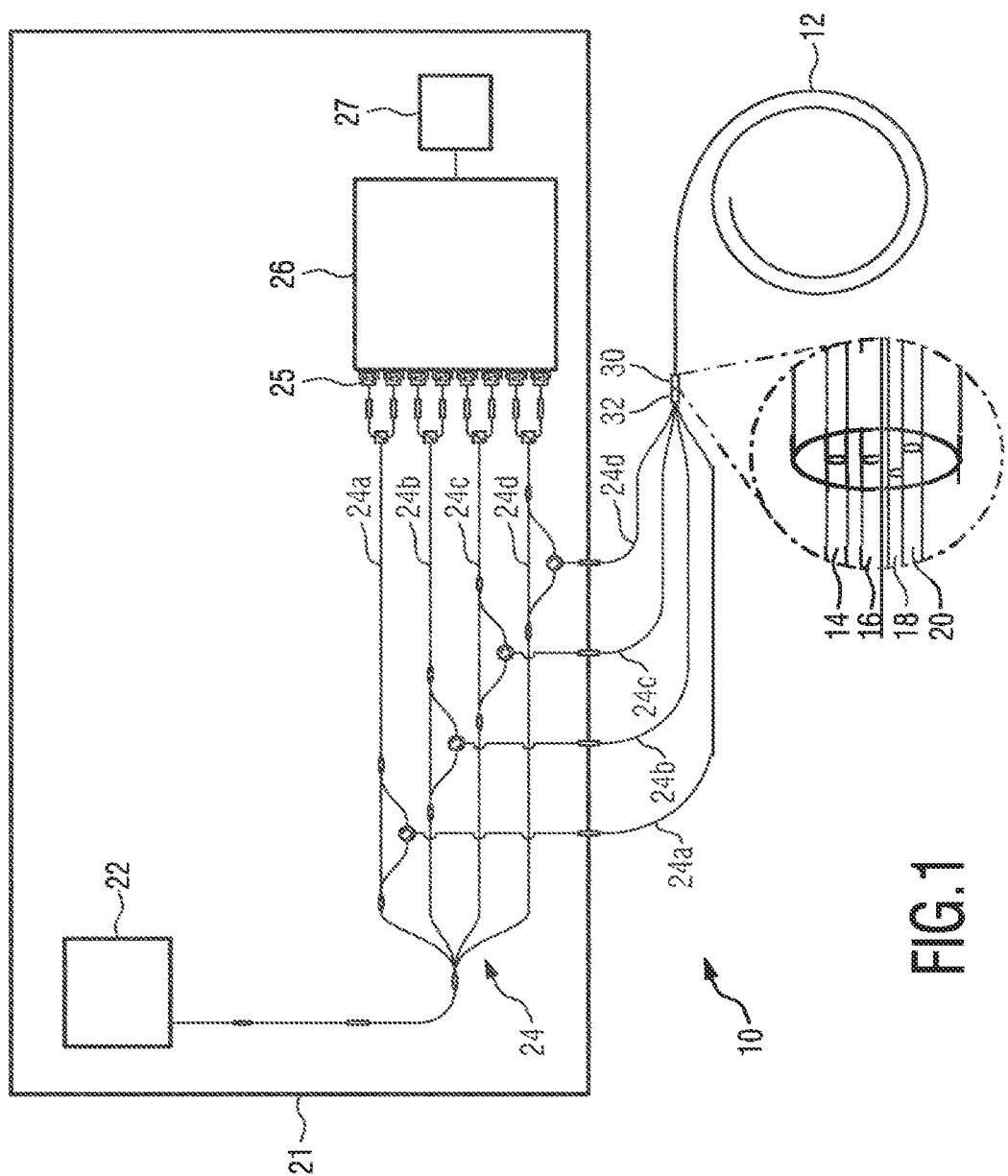
FIG. 1 schematically shows a block diagram illustrating an example of an optical system for shape sensing.
Figure 2:
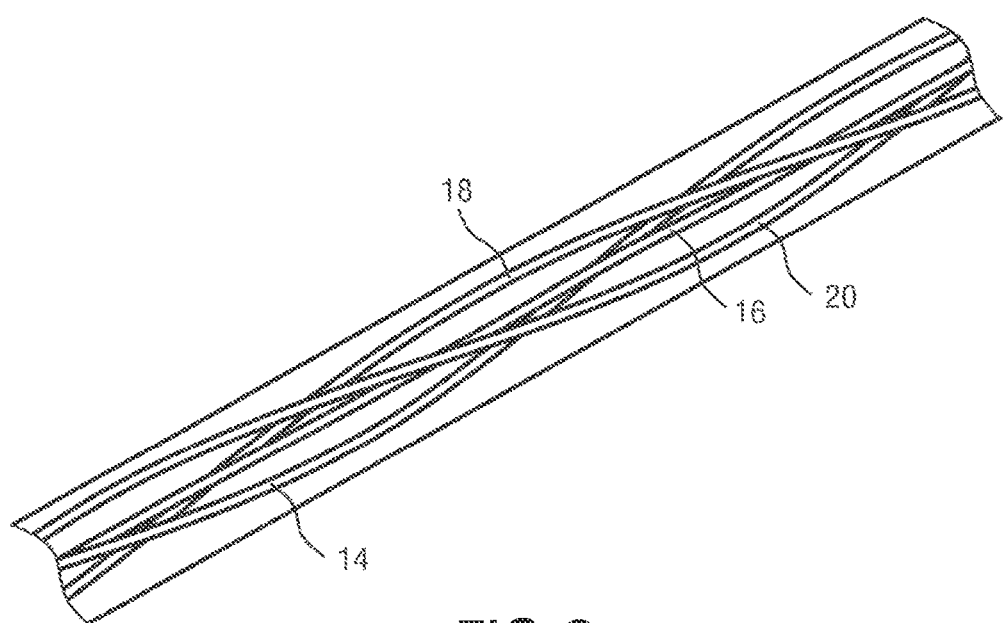
FIG. 2 schematically shows a perspective view of an example of an optical fiber sensor.

FIG. 1 schematically shows parts of an optical fiber sensor system 10 configured as a multi-channel optical frequency domain reflectometry (OFDR)-based and distributed-strain sensing system for sensing an optical fiber sensor 12. The optical fiber sensor 12 comprises an optical fiber having a cladding and embedded therein a plurality of fiber cores 14, 16, 18, 20, in the present example four cores with one center core 16 and three outer cores 14, 18, 20. It is to be noted here that the optical fiber sensor 12 may have more than four cores, e.g. five, six, seven or even more. FIG. 2 shows a piece of length of the fiber sensor with the fiber cores 14, 16, 18, 20 with the outer cores 14, 18, 20 radially spaced apart from and spiraled around the center core 16. The center core 16 is arranged on the center axis of the optical fiber sensor. The outer fiber cores 14, 18, 20 are angularly spaced with respect to one another in azimuthal direction around the longitudinal center axis of the optical fiber sensor 12. According to a number of three outer fiber cores in the present example, the angular spacing between neighboring outer cores may be 120°.

With reference again to FIG. 1, the optical shape sensing system 10 comprises an interrogation console 21. The interrogation console 21 may comprise a tunable light source 22 which can be swept through a range of optical frequencies, also referred to as scan range. The light emitted by the light source 22 is coupled into an optical interferometric network 24 having optical channels 24a, 24b, 24c, 24d according to a number of fiber cores of the optical fiber sensor 12. In case the optical fiber sensor 12 has more than four cores, the optical interferometric network 24 may have a corresponding number of more than four optical channels. Each channel forms an interferometer for one of the fiber cores 14, 16, 18, 20.

When the tunable light source 22 is swept through a range of optical frequencies, each channel 24a, 24b, 24c, 24d and thus each fiber core 14, 16, 18, 20 of the optical fiber sensor 12 is simultaneously and independently optically interrogated, and each interference signal created by the light returning from each of the fiber cores 14, 16, 18, 20 is routed to a processing unit or a data acquisition unit 26 via respective photodetectors 25. The distributed strain measurement from the fiber cores 14, 16, 18, 20 using the multiple channel OFDR system may then be exported to a unit 27 for further processing, in particular for three-dimensional shape reconstruction of the optical fiber sensor 12 and, for example, for visual display of the reconstructed three-dimensional optical fiber sensor 12.

The fiber cores 14, 16, 18, 20 of the optical fiber sensor 12 comprise fiber Bragg gratings (FBGs) which are wavelength sensitive reflective structures. Each fiber Bragg grating is formed by periodic variations in the refractive index along the fiber Bragg grating. An FBG reflects light of a certain wavelength (also referred to as resonance wavelength), and transmits all other wavelengths. The resonance wavelength is also referred to herein as reflection peak wavelength. When a local bend is imparted on the optical fiber sensor 12, the resonance wavelength is shifted (decreased or increased) by strain, and a measurement of the reflected wavelength for any position along the fiber allows determining the local strain.

Next, a description is give in order to better elucidate the invention.

In optical shape sensing, distributed strain measurements are performed simultaneously on each of the fiber cores 14, 16, 18, 20 of the multi-core fiber sensor 12, from which specific deformations of the optical fiber at every position along the length of the fiber sensor are calculated. The distributed strain measurement may be performed, for example, with the method of swept-source interferometry, in which the wavelength of light source 22, e.g. a single-mode laser, is varied monotonically over a well-defined wavelength range. Each fiber core 14, 16, 18, 20 is in communication with its own interferometer of the interferometric network 24. The light from the light source 22 is fed into the interferometers with a reference branch and the measurement branches. The measurement branches contain the fiber cores of the fiber sensor under test. The detectors 25 measure the combination of the light reflected from the cores of the fiber sensor under test and the light traversing through the reference branch. The detector signal is sampled in equidistant steps of optical frequency.

In Fourier Domain Backscatter Reflectometry, the interferometric spectrum is Fourier transformed resulting in a signal as function of optical delay time τ, i.e. position z on the device (τ=2nz/c, where a factor of 2 is taken into account since the light is travelling up and down in the fiber sensor).

Owing to the Fourier transform the total frequency scan range $\Delta v = c\Delta\lambda/\lambda^2$ is inversely proportional to the resolution in delay, so that the spectral width is related to the spatial resolution δz by:

$$\delta z = \frac{\lambda^2}{2n\Delta\lambda} \quad (1)$$

The maximum amount of strain that can be observed is limited by the total scan range with which the fiber sensor is interrogated. This means that the minimum amount of bend radius is limited by that scan range. As a consequence, the spatial resolution is fixed by the intended range of curvature that the device has been designed for. Another relationship between the two Fourier domains is the one between the spectral resolution δλ, i.e. the step size in optical frequency during sampling of the signals, and the largest length L of the fiber sensor under test that the system is able to characterize:

$$L = \frac{\lambda^2}{4n\delta\lambda} \quad (2)$$

Here, the additional factor of 2 expresses the fact that positive and negative delays give rise to similar signals in an interferometer. Differently spoken, the factor of 2 is a consequence of the Nyquist theorem. Given the choice of maximum length, the spectral resolution is fixed, and hence the smallest amount of strain that can be observed. The smallest amount of strain will fixate the largest bend radius. A third relationship originating from the Fourier transform deals with the shift $\delta x_{shift}$ in the spectrum owing to a change in strain on the one hand and the change in the slope of the phase φ in the time domain on the other:

$$\frac{d\Delta\varphi}{di} = -2\pi\frac{\delta\lambda_{shift}}{\Delta\lambda} \quad (3)$$

It is to be noted that in optical shape sensing a measurement is always compared to a measurement where the fiber sensor is in a reference shape, which usually is a straight line. The left hand side of equation (3) shows the derivative of this difference in phase between the two measurements with respect to the sample number index i in the time delay domain. An increase of the index number i corresponds to a position change of δz as given by equation (1). Equation (3) expresses the fact that the information of shape is represented by the phase of the signals in the time domain. Furthermore, the fact that a difference in phase has to be evaluated means that the two measurements have to be aligned in position (time domain). Strain irrespective of whether it is due to curvature, twist or a common mode effect (temperature and axial strain) causes a change in length and thereby in position. When going from proximal to the distal end of a fiber sensor under test, the strain can be accumulated to arbitrary amounts. The process of compensating the associated positional shift is called phase tracking. The characteristics of the phase of the measurement while the fiber sensor is in the reference shape are of paramount importance.

As mentioned before, in optical shape sensing the recorded spectrum is Fourier transformed into a signal in the time delay domain. While Fourier transforming, the total amount of power is conserved, but the distribution of it can be vastly different in the two domains. When recording a relatively narrow reflection spectrum over a much wider scan range, only a fraction of the data points sampled receive a substantial amount of optical power. After a Fourier transform, the total amount of power is spread out over all the data points in the time delay domain that represent the full length of the fiber sensor. In contrast, the noise is incoherent and will generally be distributed evenly in both Fourier domains. For fiber sensors exhibiting a narrow spectrum the signal-to-noise ratio will be reduced when considering the data in the time delay domain.

The invention proposes to mitigate these effects by increasing the effective width of the total reflection spectrum of the fiber sensor 12 while keeping the local reflection spectrum at a particular position along the sensor 12 as narrow as possible. This is accomplished according to the invention by virtue of providing each fiber core 14, 16, 18, 20 of the fiber sensor 12 with a plurality of fiber Bragg gratings each having a different resonance wavelength, which preferably is stepwise shifted from FBG to FBG of the respective fiber core. Thereby, the effective spectral width of the total reflection spectrum of the fiber sensor is increased while keeping the local spectrum at a particular position along the fiber sensor as narrow as possible.

In the following, embodiments of the optical fiber sensor 12 according to the principles of the present invention will be described.

Figure 3:
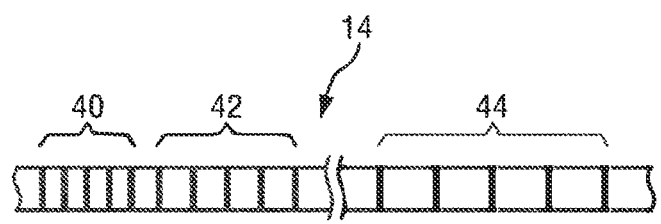
FIG. 3 schematically shows a portion of a fiber core of the optical fiber sensor in FIG. 2 with single fiber Bragg gratings.

At least one of, preferably all of the fiber cores 14, 16, 18, 20 of the optical fiber sensor 12 each have a plurality of single fiber Bragg gratings arranged in series along the respective fiber core, preferably immediately adjacent to one another, i.e. concatenated to each other. Each fiber Bragg grating has a single reflection spectrum around a single reflection peak wavelength when interrogated with light in an unstrained state of the respective fiber core. The reflection peak wavelengths (resonance wavelengths) of the single reflection spectra are different from fiber Bragg grating to fiber Bragg grating along the respective fiber core. FIG. 3 shows, very schematically and not to scale, an example of a portion of the fiber core 14 with fiber Bragg gratings 40, 42, 44. Each fiber Bragg grating 40, 42, 44 may have a different periodicity resulting in a different individual resonance wavelength. Thus each FBG 40, 42, 44 has an individual single reflection spectrum around a single reflection peak wavelength when interrogated with light in an unstrained state of the fiber core. The reflection peak wavelengths of the single reflection spectra of the single fiber Bragg gratings preferably are monotonically shifted, preferably stepwise, from fiber Bragg grating to fiber Bragg grating along the fiber core. It is to be understood, that the number of single FBGs may be larger than 10, even larger than 20 or more, depending on the length of the sensor 12 and the length of the single FBGs.

The resonance wavelength $\lambda_B$ of a fiber Bragg grating is determined by the periodicity $\wedge$ and the refractive index n of the optical mode in the fiber as follows:

$$\lambda_B = 2n\wedge \quad (4)$$

The factor of 2 owes its origin from the fact that the reflection spectrum is considered and the light is moving back and forth. The width of the reflection spectrum or of the resonance is determined mainly by the total number of periods. The longer the fiber Bragg grating the smaller the width $\Delta\lambda_B$ of the resonance or of the reflection spectrum. In addition to this effect, the reflection spectrum of a single frequency grating broadens when the reflection amplitude or reflectivity approaches 100%.

Figure 4A:
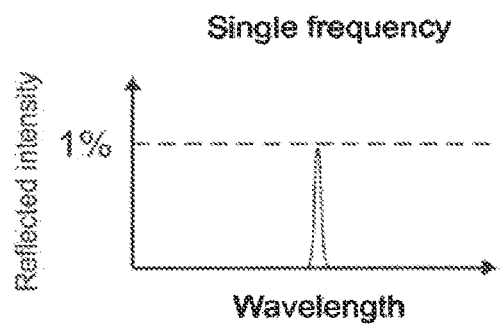
FIG. 4A shows a schematic diagram of a reflection spectrum from an optical fiber sensor having a narrow reflection spectrum.

FIG. 4A shows the total reflection spectrum of a fiber core when all FBGs thereof have the same resonance wavelength. In the example in FIG. 4A, it is assumed that the reflection amplitude of all fiber Bragg gratings is 1%.

An optical fiber sensor having such a globally narrow reflection spectrum over the length of the sensor has the above described disadvantage that the signal-to-noise ratio will be reduced when considering the data in the time delay domain.

Figure 4B:
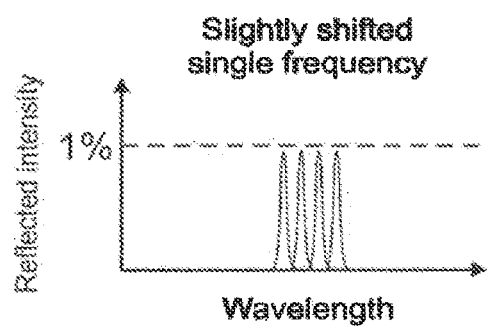
FIG. 4B shows a schematic diagram of a reflection spectrum from an optical fiber sensor having fiber Bragg gratings which vary stepwise in resonance wavelength.

FIG. 4B in contrast schematically shows that a sensor having concatenated single fiber Bragg gratings having different reflection peak wavelengths from fiber Bragg grating to fiber Bragg grating exhibits a total reflection spectrum which is broadened in comparison with a fiber core having fiber Bragg gratings with same reflection peak wavelengths as shown in FIG. 4A. In FIG. 4B, exemplarily four single reflection spectra are shown, originating from four fiber Bragg gratings having different resonance wavelengths or reflection peak wavelengths shifted from FBG to FBG by a small step. Different resonance wavelengths can be achieved by varying the periodicity $\wedge$ from fiber Bragg grating to fiber Bragg grating according to equation (4), as exemplarily shown in FIG. 3.

According to FIG. 4B, since the fiber Bragg gratings have different resonance wavelengths, the total reflection spectrum which is the sum of all single reflection spectra of the single fiber Bragg gratings, is spread, and there is more power in the reflection spectrum in comparison with FIG. 4A, because the total spectrum is wider, while the highest reflectivity may be kept still at or below 1% as in FIG. 4A.

As mentioned above, a fiber Bragg grating is formed by a periodically varying refractive index of the propagating mode in the fiber core along the length of the FBG. The amount of modulation in refractive index $\Delta n$ determines the amount of reflectivity. Optical shape sensing operates in the regime of small reflectivity in order to avoid problems associated with multiple reflections between different fiber Bragg gratings. Consequently, according to the principles of the invention, the reflectivity of the FBGs or reflection amplitude of the single reflection spectra preferably is lower than 3%, or lower than 2% and may be even smaller. Therefore, the modulation depth $\Delta n$ of the refractive index should be small. In this regime, the width of the single reflection spectrum or resonance of a single fiber Bragg grating can be approximated by:

$$\frac{\Delta \lambda_B}{\lambda_B} \approx \sqrt{\left(\frac{\Delta n}{2n}\right)^2 + \left(\frac{\Lambda}{\ell}\right)^2} \quad (5)$$

Here, $\ell$ is the geometric length of the fiber Bragg grating.

In the limit of small reflectivity, i.e. for small perturbations $\Delta n << n$, the reflectivity of a fiber Bragg grating is the square of the Fourier transform of the taper function. The taper function is the variation of the dielectric constant in the propagation direction integrated over the cross-section of the optical mode. It describes the coupling coefficient of forward and backward traveling wave. In this limit $\Delta n << n$, the first term on the right hand side of equation (5) describing the modulation depth of the refractive index is smaller than the second term on the right hand side describing the number of periods of the fiber Bragg grating by a factor approximately equaling the reflectivity. For a resonance wavelength around 1550 nm (in the C-band) and a length of the fiber Bragg grating of, e.g., $\ell = 100$ mm, the width of a single reflection spectrum of the FBG will amount to about 8 pm. In practice, fiber Bragg gratings will not always fulfill ideal behavior so that the spectrum is actually slightly broader, usually 15-20 pm.

Successive fiber Bragg gratings should therefore have a resonance wavelength difference of about 20 pm. A ratio of the spectral width of a single reflection spectrum to the length of the single fiber Bragg grating may be in a range of $10-10$ to $3 \times 10^{-10}$.

In practice, the spectral width of a single reflection spectrum may be in a range of 10 pm-30 pm for a length of the single fiber Bragg grating of about 100 mm.

As an example, for a total length of an optical fiber sensor of 2.8 m and a fiber Bragg grating length of 100 mm, the number of fiber Bragg gratings needed is 28, and the total width of the full spectrum spanned by the single reflection spectra of all fiber Bragg gratings should minimally be 560 pm (28×20 pm). In this way, 28 times more signal is available for a fiber sensor with stepped single-frequency Bragg gratings (for example FIG. 4B) with respect to the non-stepped case (for example FIG. 4A).

Figure 5:
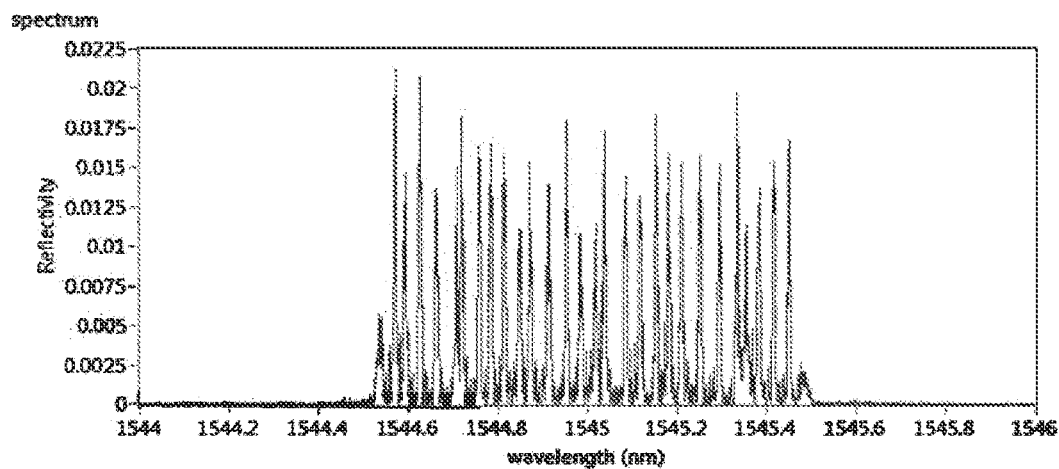
FIG. 5 shows a diagram of experimentally measured reflection spectrum from an optical fiber sensor of a length of 2.8 m having 28 fiber Bragg gratings each with a length of 100 mm.

FIG. 5 shows, for the afore-mentioned example of a fiber core of 2.8 m length with 28 fiber Bragg gratings the total reflection spectrum as experimentally measured. Each reflectivity peak in FIG. 5 comes from a single FBG. The spectral width of the total reflection spectrum is 0.9 nm caused by the fact that the separation in reflection peak wavelength between adjacent fiber Bragg gratings is on average around 35 pm. In general, the difference between reflection peak wavelengths of the single reflection spectra of adjacent fiber Bragg gratings may be equal to or larger than a spectral width of the single reflection spectra of the adjacent fiber Bragg gratings.

As shown in FIG. 5, the reflectivity amplitude of the single reflection spectra is less than 3%, and around 2% at the maximum, and for some of the fiber Bragg gratings even lower than 2%.

Figure 6:
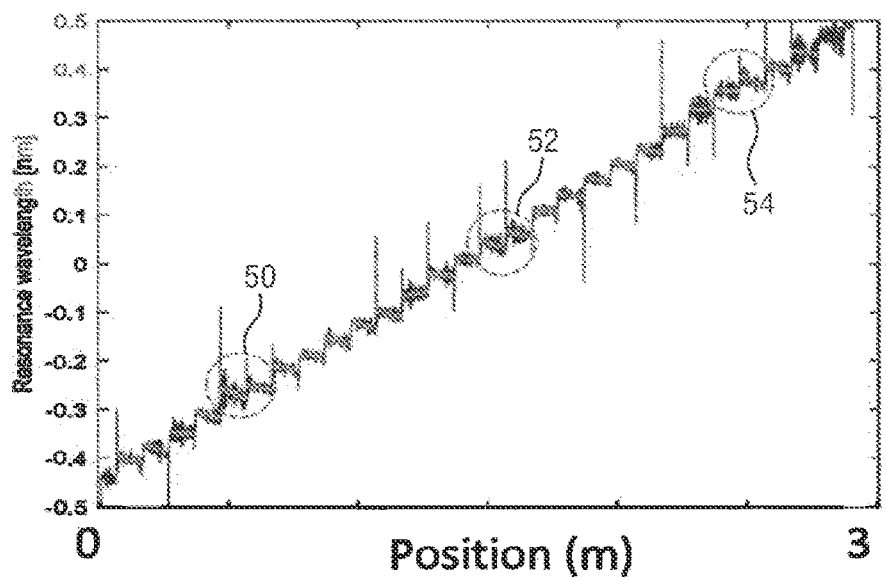
FIG. 6 shows a diagram of resonance wavelengths of the 28 FBGs as a function of position along the optical fiber sensor having the reflection spectrum of FIG. 5.

The filling factor of the total spectrum is the ratio of the integral of the actual measured reflection spectrum and the surface area of the ideal spectrum that covers the full width of 0.9 nm. In FIG. 5, the value for the filling factor is around 0.2. This means that the same amount of reflectivity could be put in a 5 times narrower spectrum or 5 times more reflectivity may be obtained in the same band while keeping the maximum reflection at any wavelength low enough to prevent multiple reflections. The reason for the small filling factor lies in the finite reproducibility of the writing process of fiber Bragg gratings, as best explained with reference to FIG. 6 showing the resonance wavelengths of the sensor as function of position along the fiber core. Optimally, the resonance wavelength is designed to be constant over the full length of a fiber Bragg grating, but as shown in FIG. 6, the resonance wavelength stability within one fiber Bragg grating is only in the order of 10 pm-20 pm due to the robustness and reproducibility of the writing process. FIG. 6 shows the step-like behavior of the resonance wavelengths between successive gratings, but also shows an occasional small chirp within the length of a single fiber Bragg grating. In FIG. 6, encircled areas 50, 52, 54 display regions in which resonances of adjacent fiber Bragg gratings exhibit a spectral overlap. This means that the single reflection spectra of these adjacent fiber Bragg gratings are not well separated or distinguished from each other. These overlaps may give rise to interference effects which might be constructive or destructive depending on the optical distance between the fiber Bragg gratings in relation to the wavelength. Constructive interference leads to high peaks in the reflectivity and enhanced probability of multiple reflections. Multiple reflections should be avoided leading to a maximization of the width of the total reflection spectrum.

While it is desirable to have a total spectral width of the reflection spectrum along the fiber core as large as possible, the spectral width of the total spectrum should however be not too large for several reasons. In the present example of a sensor having 28 FBGs on a length of 2.8 m, the spectral width of the total spectrum is about 0.9 nm (see FIG. 5) which should not be exceeded or at least not exceeded much as will be explained hereinafter.

Figure 7:
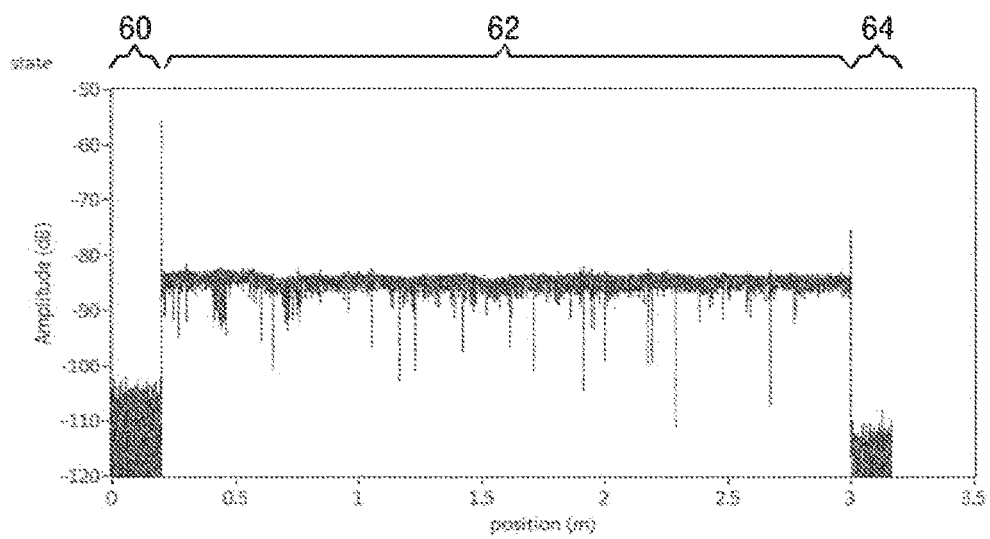
FIG. 7 shows a diagram of an amplitude of an interferometric signal as a function of position along the optical fiber sensor, wherein the diagram is obtained by Fourier transforming the reflection spectrum in FIG. 5.

The upper limit of the spectral width of the total spectrum spanned by the single reflection spectra is for example determined by the finite accuracy with which the signal data of one fiber core of the sensor can be aligned to the signal data of the other fiber cores of the sensor. Misalignment in combination with a monotonous change of the resonance frequency will give rise to a pseudo-twist in the data processing of optical shape sensing resulting in an inaccuracy of shape. This can be explained when Fourier transforming the signal data in FIG. 5, i.e. the reflection spectrum as function of optical frequency or wavelength. The Fourier transform results in data as function of optical delay or data as function of position along the length of the sensor. The Fourier transformed data of FIG. 5 are shown in FIG. 7. FIG. 7 shows the amplitude of the interferometric signal as a function of position along the sensor. At the start of the fiber sensor, a relatively high peak can be observed. It is caused by the optical connector at the start of the fiber sensor. FIG. 1 exemplarily shows a connector 30 of the fiber sensor coupled to a connector 32 of the patch cord connecting the sensor 12 to the interrogation console 21 in order to connect the fiber cores of sensor 12 to the interferometric network 24. For all fiber cores in the fiber sensor the physical location of the connector interface 30/32 is at the same delay in the time domain. Due to variations in fiber length and/or refractive indices in the optical elements of different interferometers of the interferometric network 24, the connector interface will appear at apparent different delays for different fiber cores of the fiber sensor. The data of one fiber core can be shifted with respect to the other fiber core in such a way that the connector peaks overlap thereby aligning the fiber cores so that their data can be combined into bend and twist.

Core alignment accuracy may be determined depending on the accuracy of the peak finding algorithm for finding peaks in FIG. 7 and the index length or segment length of the fiber sensor which is the same as the spatial resolution as given by equation (1) above. For example, for an accuracy of the peak finding algorithm of about 0.03 in units of distance between adjacent sampling points and a scan wavelength range of 16.7 nm with a central wavelength of 1545 nm, the segment length is 48 µm and core alignment accuracy is about 1.5 µm.

According to FIG. 6, adjacent fiber Bragg gratings have different resonance wavelengths. According to equation (3), the slope of the phase will change at each step from one fiber Bragg grating to the next. When the slope of the phase increases linearly along the length of the fiber sensor, the phase will show a quadratic behavior. The difference in phase of two fiber cores which have been erroneously misaligned will exhibit a linear dependence as function of position. Twist is calculated from the difference in phase between the average phases of three outer cores (e.g. fiber cores 14, 18, 20 in FIG. 2) with respect to the phase of the central core (e.g. fiber core 16 in FIG. 2). A misalignment between fiber cores will result in an effective linear pseudo-twist signal along the length of the fiber sensor causing errors in shape. The amount of effective pseudo-twist can be estimated from:

$$\delta\theta_{pseudo\,twist} = \frac{2\pi}{TG} \frac{\delta\lambda_B}{\Delta\lambda} \delta i \qquad (6)$$

The quantity TG is a calibration constant describing the ratio between twist angle and signal phase. For the example fiber sensor exhibiting the measured reflection spectrum in FIG. 5, the absolute value of TG is around 4.2. Given a scan wavelength range of $\Delta\lambda=16.7$ nm and a total shift in Bragg wavelength of $\delta\lambda_B=0.9$ nm (spectral range of total reflection spectrum as shown in FIG. 5) and an alignment accuracy of $\delta i=0.03$, the twist error is more than 2 mrad at the tip of the fiber sensor. For shape sensing purposes, the error in twist should not be increased further, in order to keep the accuracy in tip position within a few mm. This requirement thereby effectively limits the maximum allowed shift in Bragg resonance wavelength, or in other words the maximum spectral width of the total reflection spectrum.

There is a further aspect that sets an upper limit to the maximum spectral width of the total reflection spectrum of the fiber sensor.

This aspect is based on the circumstance that the design of the fiber Bragg gratings should be such that their reflection spectra fall at all times within the used scan wavelength range of the light source 22 of the interrogator console 21 when the fiber sensor is subject to bending, twisting, temperature and axial strain. If the resonance wavelengths of the fiber Bragg gratings shift out of the scan wavelength range, the reflection spectra cannot be measured and the shape reconstruction will fail.

There are several effects that influence the resonance wavelengths or reflection peak wavelengths of the fiber Bragg gratings in all fiber cores, such as axial strain and temperature, bend strain and twist. The fiber Bragg gratings in the outer fiber cores (fiber cores 14, 18, 20 in FIG. 2) are susceptible to bend strain which causes the resonance wavelengths to shift to higher or lower wavelengths depending on the exact position of the respective outer fiber core with respect to the bend. The magnitude of the shift $\Delta\lambda_B$ from the nominal resonance wavelength $\lambda_B$ in the unstrained state of the fiber core depends on the bend radius R, the distance a of the fiber core from the center axis of the fiber sensor, the temperature difference $\Delta T$ and the axial strain $\epsilon_{axial}$ according to the following equation:

$$\Delta\lambda_B = \lambda_B\left(0.796 \cdot \left[\frac{a}{R} + \epsilon_{axial}\right] + 8.59 \cdot 10^{-6} \cdot \Delta T\right), \qquad (7)$$

The numerical values in equation (7) are given by different material properties for a typical glass fiber.

An optical fiber sensor according to the principles of the present invention may be incorporated in a medical device, such as a guide wire or a catheter. In this case, the fiber sensor should be able to reconstruct bend radii as small as 6 mm, work under at least 500 microstrain, and operate both at room temperature and inside a human body where the temperature is approximately 20 degrees higher than in the environment. From equation (7), it can be calculated that when $\lambda_B=1545$ nm, a bend radius of 6 mm results in wavelength shifts $\Delta\lambda B$ of $+/-7.2$ nm, spanning in total a range of 14.4 nm. The temperature difference and the axial strain shift the resonances another 0.3 nm and 0.6 nm to higher wavelength respectively. For a total scan range of 16.7 nm, this leaves $16.7-14.4-0.3-0.6=1.4$ nm for broadening the total reflection spectrum spanned by the single reflection spectra of the single fiber Bragg ratings, which are step-like shifted from fiber Bragg grating to fiber Bragg grating, or in other words, by step-like shifts of the resonance wavelength between adjacent fiber Bragg gratings. Thus, the total spectral range of the sensor's reflection spectrum preferably should be lower than 1.4 nm.

An optical fiber sensor having fiber cores with single-resonance wavelength fiber Bragg gratings stepped from fiber Bragg grating to fiber Bragg grating has the advantage that the signal-to-noise ratio of the signal data as function of optical delay is increased. In the following, it will be described that this advantage is indeed achieved by the present invention.

With reference to FIG. 7 again, three regions can be distinguished in the diagram of FIG. 7. A first region 60 contains reflections from the patch cord connecting the fiber sensor to the interrogation console 21. Its magnitude is determined by Rayleigh scattering at a level of −113 dB. A middle region 62 contains reflections from the fiber sensor 12 with a length of 2.8 m. The magnitude of this signal is 28 dB larger than the signal from the Rayleigh scattering in the patch cord in the region 60. The reflection coefficient for the fiber Bragg gratings is on average about 2% (see FIG. 5). The interferometer signal is proportional to the Fresnel coefficient which equals the square root of the intensity reflection. When the Fresnel coefficient for a fiber Bragg grating of 100 mm length equals $(0.02)^{1/2}=0.14$, then the reflection from a segment length of 50 μm will equal $7\times10^{-5}$ corresponding to the observed value of −85 dB. A third region 64 beyond the tip of the fiber sensor 12 contains only noise at a level of about −120 dB. Under the assumption that not only reflection from fiber Bragg gratings, but that also Rayleigh scattering originating from the fiber sensor 12 will generate useful data, the signal-to-noise ratio is approximately 35 dB.

In the following, the limit of shape sensing accuracy owing to the finite signal-to-noise ratio will be estimated.

In optical shape sensing, the shape of the fiber sensor 12 is reconstructed from bend signals in two directions and a twist signal. The twist signal is the smallest in magnitude and most prone to error. For a fiber sensor 12 with four fiber cores (e.g. cores 14, 16, 18, 20 in FIG. 2) in which three fiber cores 14, 18, 20 are helically wound around the central core 16, the twist can be inferred from the phase differences of the four fiber core signals with:

$$\theta_{twist} = \frac{1}{TG}\left(\frac{\Delta\varphi_1 + \Delta\varphi_2 + \Delta\varphi_3}{3} - \Delta\varphi_0\right) \quad (8)$$

Fluctuations in the twist angle will be governed by inaccuracies of the phases of the fiber core signals, which in turn will be limited by their signal-to-noise ratios:

$$\delta\theta_{twist} = \frac{\delta\varphi}{TG}\sqrt{\frac{4}{3}} \approx \frac{1}{TG\cdot SNR}\sqrt{\frac{2}{3N_{avg}}} \quad (9)$$

Figure 8:
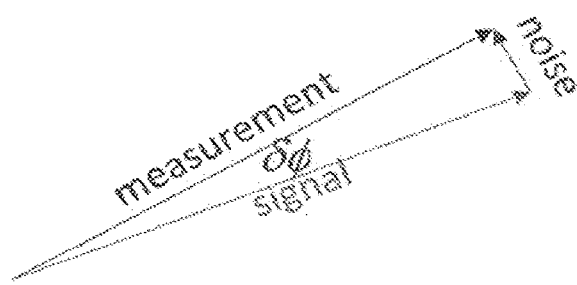
FIG. 8 shows a schematic diagram illustrating the change of phase of a complex signal while adding noise.

Here, the noise of the phase is estimated to be equal to $1/(SNR\ 2^{1/2})$. A complex signal has an amplitude and a phase and can be represented by a vector with length and direction in two-dimensional space. Adding noise is like adding two vectors. The signal-to-noise ratio is represented by the ratio of the length of the two vectors. This is shown in FIG. 8. The phase of the noise, i.e. the direction of the noise vector, will be distributed randomly. When the direction of the noise vector is perpendicular to the signal it will have a maximum effect on the phase of the total signal. On average its root mean square influence will be a vector of $2^{1/2}$ smaller. In reconstructing shape the twist signal does not need to be known with a spatial resolution of the segment length of 50 μm. Usually it suffices to maintain spatial resolutions between 0.5 mm-1 mm so that it is permissible to average twist over a number of points. This is expressed in equation (9) by inserting an additional factor $N_{avg}^{1/2}$. As an example, with a twist gain value of TG=4.2, a signal-to-noise SNR=56 and an averaging length of $N_{avg}$=16, the estimated error in twist is $\delta\theta_{twist}$=1 mrad. As an example, when a shape is considered which extends 1 m beyond a bend of 90 degrees, the twist error will then result in an inaccuracy of the tip position of 1 mm.

The advantage of fiber sensors with fiber Bragg gratings each having a single wavelength resonance compared to fiber sensors with only Raleigh scattering is the increase in signal and the smoothness of the phase as function of position. Broadening the reflection spectrum by stepping the resonance wavelength from one fiber grating to the other fiber Bragg grating does not change these advantages, except at the concatenating points of the fiber Bragg gratings. At the concatenating points, the phase may make a sudden jump. Further, small gaps in signal strength at these concatenating points will occur due to the finite positioning of the fiber Bragg gratings during the writing process. These difficulties may be mitigated by the smoothing process, i.e. by using an averaging factor $N_{avg}$ as described above, and will be successful as long as the gaps between adjacent fiber Bragg gratings are much smaller than the averaging length expressed by the factor $N_{avg}$.

In a method of optically interrogating an optical fiber sensor, an optical fiber sensor according to the principles of the invention is provided and light is irradiated into the one or more fiber cores, the light is scanned through a scan wavelength range, wherein the scan wavelength range is centered at a wavelength which substantially is a center wavelength of a total spectral range spanned by the single reflection spectra of the one or more fiber cores in an unstrained state thereof, and reflection light from the one or more fiber cores is received, the reflection light originating from the fiber Bragg gratings of the one or more fiber cores.

Optical fiber sensors having fiber cores each having a plurality of fiber Bragg gratings with single resonance wavelengths varying step-wise from fiber Bragg grating to fiber Bragg grating can be manufactured as follows. In order to write fiber Bragg gratings into an optical fiber, a spool-to-spool technology can be used in which UV light from e.g. an Excimer laser is scanned across a phase mask with a grating structure. The optical fiber is located in close proximity of the phase mask. In this way, the periodicity of the mask is transferred to the fiber cores of the optical fiber. By clamping the optical fiber, it is possible to add a well-defined amount of strain during writing. After releasing the optical fiber, the fiber relaxes and the effective periodicity is slightly different from the original phase mask. For each fiber Bragg grating to be produced a different amount of strain is applied to the optical fiber. The length of the fiber Bragg grating is determined by the length of the phase mask. The speed at which the UV light is scanned across the mask can be varied. This gives the opportunity to manipulate the strength (reflectivity) of the grating in an arbitrary way. For instance, near the beginning and end of a fiber Bragg grating, the grating strength can be increased or decreased in order to reduce the effects of gaps at the concatenation points of successive gratings. It is to be noted that such 'gaps' might also arise from overlapping the resonances of two fiber Bragg gratings while having destructive interference. The manufacturing process described before is only an example of a possible manufacturing method.

Instead of a phase mask two interfering beams from the same UV source can also be produced by a Lloyd mirror or a Lloyd prism configuration. Furthermore, the periodicity of the Bragg gratings can be altered by changing the angle between the interfering beams. This can be accomplished by two adjustable relay mirrors. Instead of scanning a laser beam across a phase mask and using multiple laser pulses a single pulse illumination can be used in order to avoid vibration instabilities. Another alternative for the writing process is a point-by-point method. Focusing a beam to the size of half the grating period, interrupting the beam and subsequently moving the spot a full period can create Bragg gratings with almost unlimited flexibility albeit at a relatively slow speed.

It is to be understood that the description above has been given in order to elucidate the advantages of optical fiber sensors having one or more fiber cores, each having a plurality of single fiber Bragg gratings arranged in series along the fiber cores, wherein each fiber Bragg grating has a single reflection spectrum around the single reflection peak wavelength when interrogated with light in an unstrained state of the fiber core, and wherein the reflection peak wavelengths of the single reflection spectra are different from fiber Bragg grating to fiber Bragg grating along the fiber cores.

It is to be understood further that the description above is not limiting the scope of the invention which is solely defined by the claims dependent to the present application.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. An optical fiber sensor, comprising an optical fiber having embedded therein at least one fiber core extending along a length of the optical fiber, the at least one fiber core having a number of larger than ten single fiber Bragg gratings arranged in series along the at least one fiber core, wherein each fiber Bragg grating has a single reflection spectrum around a single reflection peak wavelength when interrogated with light in an unstrained state of the at least one fiber core, wherein the reflection peak wavelengths of the single reflection spectra are different from fiber Bragg grating to fiber Bragg grating along the at least one fiber core, wherein a difference between reflection peak wavelengths of the single reflection spectra of adjacent fiber Bragg gratings is equal to or larger than a spectral width of the single reflection spectra of the adjacent fiber Bragg gratings.

2. The optical fiber sensor of claim 1, wherein the reflection peak wavelengths of the single reflection spectra are monotonically shifted from fiber Bragg grating to fiber Bragg grating along the at least one fiber core.

3. The optical fiber sensor of claim 1, wherein the single reflection spectra of all fiber Bragg gratings span a total spectral range in a range of 0.6 nm to 1.4 nm in an unstrained state of the at least one fiber core.

4. The optical fiber sensor of claim 1, wherein the single reflection spectra of the fiber Bragg gratings have in each case a reflectivity amplitude of less than 3%.

5. The optical fiber sensor of claim 1, wherein the single reflection spectra of the fiber Bragg gratings have in each case a reflectivity amplitude of less than 2%.

6. The optical fiber sensor of claim 1, wherein the single reflection spectra of all fiber Bragg gratings span a total spectral range in a range of 0.8 nm to 1.0 nm in an unstrained state of the at least one fiber core.

7. The optical fiber sensor of claim 1, wherein the fiber Bragg gratings are arranged immediately adjacent to one another along the at least one fiber core.

8. The optical fiber sensor of claim 1, wherein the optical fiber has embedded therein at least four fiber cores distributed around a longitudinal axis of the optical fiber and each extending along the length of the optical fiber, the at least four fiber cores each having a plurality of single fiber Bragg gratings arranged in series along the respective fiber core, wherein each fiber Bragg grating of each of the fiber cores has a single reflection spectrum around a single reflection peak wavelength when interrogated with light in an unstrained state of the at least one fiber core, and wherein the reflection peak wavelengths of the single reflection spectra are different from fiber Bragg grating to fiber Bragg grating along the respective fiber core.

9. A method of optically interrogating an optical fiber sensor, comprising
  providing an optical fiber sensor of claim 1,
  irradiating light into the at least one fiber core, wherein the light has wavelengths scanned through a scan wavelength range, wherein the scan wavelength range is centered at a wavelength which substantially is a center wavelength of a total spectral range spanned by the single reflection spectra of the single fiber Bragg gratings in an unstrained state of the at least one fiber core,
  receiving reflection light from the at least one fiber core, the reflection light originating from the fiber Bragg gratings of the at least one fiber core.

10. The method of claim 9, wherein the scan wavelength range is increased with at least the total spectral range spanned by the single reflection spectra of the fiber Bragg gratings in an unstrained state of the at least one fiber core.

11. The method of claim 9, wherein a ratio of the scan wavelength range to the total spectral range spanned by the single reflection spectra of the single fiber Bragg gratings in an unstrained state of the at least one fiber core is in a range from 5 to 20.

12. An elongated device, comprising an optical fiber sensor of claim 1.

13. An optical system, comprising
  an optical fiber sensor of claim 1,
  an interrogation console configured to
    irradiate light into the at least one fiber core, wherein the light has wavelengths scanned through a scan wavelength range, wherein the scan wavelength range is centered at a wavelength which substantially is a center wavelength of a total spectral range spanned by the single reflection spectra of the fiber Bragg gratings of the at least one fiber core in an unstrained state of the at least one fiber core,
    receive reflection light from the at least one fiber core, the reflection light originating from the fiber Bragg gratings of the at least one fiber core.

14. An optical fiber sensor, comprising an optical fiber having embedded therein at least one fiber core extending along a length of the optical fiber, the at least one fiber core having a number of larger than ten single fiber Bragg gratings arranged in series along the at least one fiber core, wherein each fiber Bragg grating has a single reflection spectrum around a single reflection peak wavelength when interrogated with light in an unstrained state of the at least one fiber core, wherein the reflection peak wavelengths of the single reflection spectra are different from fiber Bragg grating to fiber Bragg grating along the at least one fiber core, wherein a spectral width of at least one of the single reflection spectra is in a range of 10 pm-30 pm for a length of the single fiber Bragg grating of about 100 mm.

* * * * *